Patented July 25, 1944

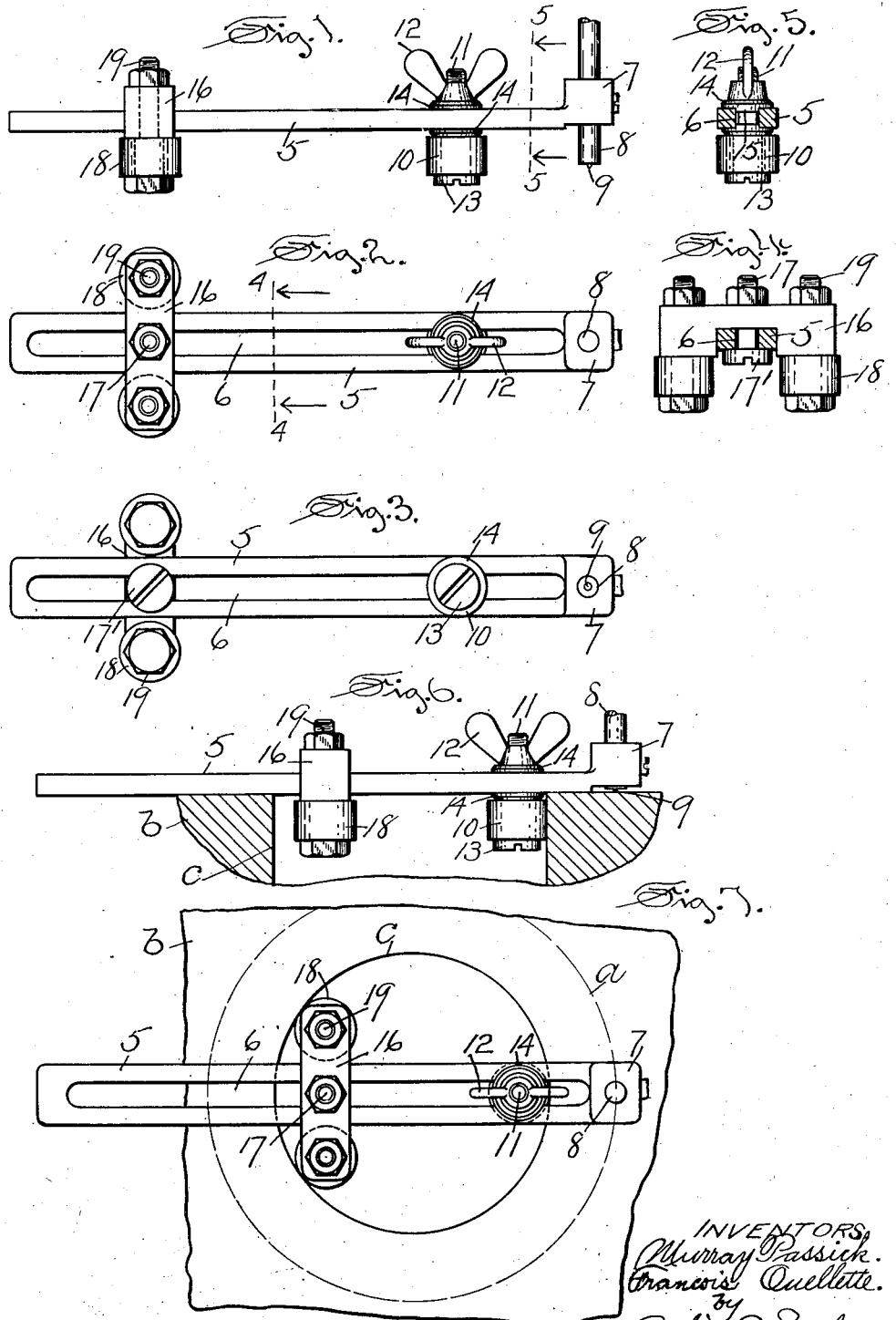

2,354,539

UNITED STATES PATENT OFFICE 2,354,539

SCRIBING INSTRUMENT

Murray Passick, Hartford, and Francois Ouellette, Wilson, Conn.

Application May 21, 1943, Serial No. 487,922

5 Claims. (Cl. 33—42)

Our invention relates to the class of devices which are employed for the purpose of scribing lines to fix the position or positions of various operations to be performed, particularly by cutting tools, and an object of the invention, among others, is the production of a scribing instrument with the use of which various positions may be determined in a simple and expeditious manner and with extreme accuracy as to location.

One form of a scribing instrument embodying the invention and in the construction and use of which the objects herein set out, as well as others, may be attained is illustrated in the accompanying drawing, in which—

Figure 1 is a side view of a scribing instrument embodying our invention.

Figure 2 is a top plan view.

Figure 3 is a bottom view.

Figure 4 is a view in section on a plane denoted by the dotted line 4—4 of Fig. 2.

Figure 5 is a view in cross section on a plane denoted by the dotted line 5—5 of Fig. 1.

Figure 6 is a view in section on enlarged scale through a block having a hole therein around which a line is to be scribed and illustrating the use of the instrument.

Figure 7 is a plan view of the structure shown in Fig. 6.

In the accompanying drawing the numeral 5 denotes the stock of our improved scribing instrument that is in the form of a bar having a slot 6 extending lengthwise therein for substantially its whole length and which terminates at one end in a head 7 that constitutes a support for a scriber 8 that is in the form of a small rod lengthwise movably mounted in the head and which may be temporarily secured against movement in any suitable manner as by means of a set screw or similar means. A scribing point 9 is fixed at the working end of the scriber. A positioning member in the form of a roller 10 is supported by the stock 5 as upon a screw 11 extending through the slot 6 and movable therealong to different positions as may be required, a clamp in the form of a thumb screw 12 being employed for temporarily holding the screw against movement. A head 13 is formed on the lower end of the screw for support of the roller 10, and washers 14 may be used if desired in the clamping arrangement, ribs 15 on the washers fitting within the slot 6 to retain the washers against turning movement.

This improved scribing instrument although not limited as to the uses for which it may be employed is particularly useful in laying out circular lines around circular openings in pieces of metal for the purpose of establishing the positions of holes to be drilled relatively to said openings. In the methods heretofore employed for doing this a piece of wood has been rigidly secured within the hole, a piece of metal being fixed in this piece of wood at the center of the hole which center being determined as by means of a straight edge placed across the hole in various positions and in a well known manner the center is fixed as by means of a prick punch, and dividers are then employed for scribing the circular line about the hole at the desired location. This is quite a long operation and the process must be followed for each circular line to be made.

By the use of our improved instrument instead of working from the center of the hole the operation takes the edge of the hole as a base from which to work and the edge of the hole is also employed as a means for scribing the circular line.

In accomplishing this purpose a mount 16 in the form of a bar is supported on the stock for lengthwise movement thereon, this mount being secured in place as by means of a clamp screw 17 extending through the slot 6 in the stock and having a head 17' adapted to be drawn into contact with the bar as by means of a nut on the opposite end of the screw and as shown in Fig. 4 of the drawing.

Stabilizing rollers 18 are mounted upon screw studs 19 extending through the mount at opposite ends thereof, the stabilizing rollers 18 being mounted upon these studs to rotate freely thereon in spaced apart relation.

In the operation of scribing a circular line a around the hole c in a piece b of material, the distance of the line a from the edge of the hole c being known and the diameters of the rod 8 and the roller 10 also being known, in the present instance it being assumed that the diameter of the rod 8 is one-fourth inch and that of the roller five-eighths of an inch, by a simple mathematical calculation the distance of the edge of the roller 10 from the point 9 is readily determined and the screw 11 is positioned to place the roller with its edge the proper distance from the point 9 which will be the distance from the edge of the hole c to the line a.

In doing this the position of the roller with respect to the scriber having been determined, a micrometer gage is employed and is set with its jaws at the proper distance apart as determined by the example, and the gage is then placed with one jaw against the scriber with the roller between the jaws and the roller 10 is then moved against the opposite jaw and fixed in place.

The instrument is then placed with the roller 10 in the hole c against its edge and the mount 16 is moved along the stock 5 until both of the stabilizing rollers 18 fit squarely against the edge of the hole on that side opposite the roller 10. This will hold the instrument firmly with the point 9 of the scriber in the position desired and the stock may then be turned with the rollers 10 and 12 in steady engagement with the edge of the hole. This will cause the line a to be produced to a substantially accurate dimension.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A scribing tool comprising a stock, a scriber mounted on said stock, guiding and supporting elements movably mounted on and with said stock during the operation of scribing a line on a piece of material and comprising at least three bearing points relatively triangularly arranged for movable support of said stock within a hole around which a circular mark is to be made to effect substantially undeviating circular movement of said scriber, and means for securing said elements in position.

2. A scribing tool comprising a stock, a scriber mounted on said stock, a positioning element movably supported by said stock, a pair of guiding elements movably mounted on said stock each in position to cooperate with said positioning element in effecting purely circular movement of said stock during the operation of scribing a line on a piece of material, and means for securing said elements in position on said stock for movement therewith in the scribing operation.

3. A scribing tool comprising a stock having a slot extending lengthwise therein, a scriber mounted in said stock, a support for a positioning roller mounted in said slot for movement therealong, a positioning roller carried by said support, a support for a set of stabilizing rollers mounted in said support, and means for securing said supports in various positions along said stock.

4. A scribing tool comprising a stock having a head at one end and a slot extending lengthwise of the stock, a scriber mounted in said head, a support for a positioning roller adjustably mounted in said slot, a positioning roller mounted on said support for cooperative action with said scriber, a support for stabilizing rollers adjustably mounted in said slot on the opposite side of said positioning roller from said scriber, a plurality of stabilizing rollers mounted on said last mentioned support, and means for securing said supports in different positions of adjustment.

5. A scribing tool comprising a stock having a slot extending lengthwise therein, a scriber mounted in said stock at one end thereof, a support for a positioning roller adjustably mounted in said slot, a positioning roller mounted on said support for cooperative action with said scriber, a bar mounted on said stock and extending on opposite sides thereof, means in said slot for securing said bar in different positions along the slot, stabilizing rollers mounted at each end of said bar, and means for securing the support for the positioning roller in different positions.

MURRAY PASSICK.
FRANCOIS OUELLETTE.